(12) United States Patent
Hwang

(10) Patent No.: US 6,323,907 B1
(45) Date of Patent: Nov. 27, 2001

(54) FREQUENCY CONVERTER

(75) Inventor: Sung-Hoon Hwang, Seoul (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 08/940,030

(22) Filed: Sep. 29, 1997

(30) Foreign Application Priority Data

Oct. 1, 1996 (KR) .................................................. 96-43362

(51) Int. Cl.$^7$ ............................... H04N 7/01; H04N 11/20
(52) U.S. Cl. .......................... 348/457; 348/441; 348/558
(58) Field of Search .................................. 348/457, 441, 348/443, 445, 446, 447, 448, 458, 459, 558; H04N 7/01, 11/20

(56) References Cited

U.S. PATENT DOCUMENTS

| | | |
|---|---|---|
| 4,630,034 | 12/1986 | Takahashi . |
| 4,703,353 * | 10/1987 | David .................................. 348/441 |
| 5,619,270 * | 4/1997 | Demmer ............................... 348/441 |
| 5,812,210 * | 9/1998 | Arai et al. ............................ 348/441 |
| 5,844,618 * | 12/1998 | Horiike et al. ....................... 348/441 |
| 5,986,715 * | 11/1999 | Ikeyama et al. ..................... 348/441 |
| 6,008,790 * | 12/1999 | Shingu et al. ....................... 348/441 |

FOREIGN PATENT DOCUMENTS 730371    1/1995   (JP) .

OTHER PUBLICATIONS

Japanese Office Action dated Jan. 23, 2001.
Haskell, "Sampling Rate Conversion for NTSC Color Television," IEEE Transactions on Communications (Jul. 1977) pp. 707–712.

* cited by examiner

Primary Examiner—Andrew Faile
Assistant Examiner—Vivek Srivastava

(57) ABSTRACT

A frequency converter is disclosed, which improves processing time and reduces hardware costs, in converting input data sampled at a first frequency into output data compatible with a system operating at a second frequency. The frequency converter has first and second coefficient generators for calculating first and second coefficient values, respectively. The frequency converter uses an interpolator for interpolating input data using the first and second coefficient values into the output data. In addition, a dual-port memory stores the output data in accordance with the first frequency and outputs the stored data in accordance with the second frequency.

24 Claims, 4 Drawing Sheets

FIG.3

| NO | COEFFICIENT VALUE($\beta$) | COEFFICIENT VALUE($\alpha$) |     |
|----|---|---|---|
| 0  | xx  | xx  | (dummy) |
| 1  | 128 | 00  | |
| 2  | 120 | 8   | |
| 3  | 112 | 16  | |
| 4  | 105 | 23  | |
| 5  | 97  | 31  | |
| 6  | 89  | 39  | |
| 7  | 81  | 47  | |
| 8  | 74  | 54  | |
| 9  | 66  | 62  | |
| 10 | 58  | 70  | |
| 11 | 50  | 78  | |
| 12 | 43  | 85  | |
| 13 | 35  | 93  | |
| 14 | 27  | 101 | |
| 15 | 19  | 109 | |
| 16 | 12  | 116 | |
| 17 | 4   | 124 | |
| 18 | xx  | xx  | (dummy) |
| 19 | 124 | 4   | |
| 20 | 116 | 12  | |
| 21 | 109 | 19  | |
| 22 | 101 | 27  | |
| 23 | 93  | 35  | |
| 24 | 85  | 43  | |
| 25 | 78  | 50  | |
| 26 | 70  | 58  | |
| 27 | 62  | 66  | |
| 28 | 54  | 74  | |
| 29 | 47  | 81  | |
| 30 | 39  | 89  | |
| 31 | 31  | 97  | |
| 32 | 23  | 105 | |
| 33 | 16  | 112 | |
| 34 | 8   | 120 | |

FREQUENCY CONVERTER

BACKGROUND OF THE INVENTION

1. Field of the Invention

The present invention relates to a frequency converter, and more particularly, to a frequency converter for converting input data sampled at a first frequency into output data compatible with a system operating at a second frequency.

2. Description of the Prior Art

Generally, when a television system converts an analog TV signal into a digital signal using a predetermined sampling frequency, the predetermined sampling frequency may be incompatible with a television using a different sampling frequency. Therefore, a frequency converter is required when signals sampled at one sampling frequency must be converted into signals compatible at another sampling frequency. Thus, a frequency converter allows for signals to be transmitted to systems using different sampling frequencies.

A prior art frequency converter, as disclosed by Takahashi U.S. Pat. No. 4,630,034, is illustrated in FIG. 1.

The prior art frequency converter includes a write address counter 10, a master counter 12, a memory controller 14, a read address counter 16, a first buffer memory 18, a second buffer memory 20, an interpolation controller 22, and an interpolation filter 24.

The write address counter 10 outputs a write address signal (WA) based on a count value from counting a sampling pulse signal ($S_A$) sampled at a first sampling frequency ($f_A$). The write address counter 10 outputs the write address signal (WA) to both the first buffer memory 18 and the second buffer memory 20.

The master counter 12 counts a sampling pulse signal ($S_B$) sampled at a second sampling frequency ($f_B$). The master counter 12 outputs a count value of the sampling pulse signal ($S_B$) to the memory controller 14 and to the interpolation controller 22. The memory controller 14 receives the count value from the master counter 12 and the sampling pulse signal ($S_B$). Based on the output from the master counter 12 and the sampling pulse signal ($S_B$) the memory controller 14 outputs read/write control signals (R/W) to the two control lines that are connected to the first buffer memory 18 and to the second buffer memory 20, respectively.

The memory controller 14 also outputs a clear signal (CLEAR) to the write address counter 10, the master counter 12, and the read address counter 16 and outputs a control signal to the read address counter 16. Based on the received clear signal (CLEAR) and the control signal from the memory controller 14, the read address counter 16 outputs a read address signal (RA) to the first buffer memory 18 and to the second buffer memory 20. The write address counter 10 also outputs the write address signal (WA) based on the clear signal (CLEAR) from the memory controller 14.

The first and second buffer memories 18 and 20 store input data (INPUT) sampled at the sampling frequency ($f_A$) in a memory cell based on the (R/W) control signals from the memory controller 14 and the write address signal (WA) from the write address counter 10. That is, the first buffer memory 18 or the second buffer memory 20 receiving a write control signal (W) and the write address signal (WA) stores the input data (INPUT) at the designated memory cell dictated by the write address signal (WA). The write address signal WA determines the memory cell location to store the input data (INPUT).

The first and second buffer memories 18 and 20 output the stored input data (INPUT) to an interpolation filter 24 in accordance with the read address signal (RA) from the read address counter 16 and the read control signal (R) from the memory controller 14. That is, the first buffer memory 18 or the second buffer memory 20 receiving the read control signal (R) and the read address signal (RA) outputs the stored input data (INPUT) from the memory cell location dictated by the read address signal (RA).

The interpolation controller 22 stores filter coefficient values, used by the interpolation filter 24, and controls a linear interpolation process in the interpolation filter 24 based on the count value from the master counter 12. The interpolation filter 24 linearly interpolates the stored input data (INPUT) outputted from the first and second buffer memories 18 or 20 in accordance with the output from the interpolation controller 22 to convert the input data (INPUT) sampled at a frequency ($f_A$) into output data (OUTPUT) compatible with a sampling frequency ($f_B$) based on the filter coefficient values stored in the interpolation controller 22.

The operation of the prior art frequency converter, as shown in FIG. 1, will now be described.

The write address counter 10 outputs the write address signal (WA) based on the sampling pulse signal ($S_A$) having the sampling frequency ($f_A$) and the clear signal (CLEAR) from the memory controller 14. The sampling frequency ($f_A$) corresponds to the sampling rate of the input data (INPUT). Thus, the write address counter 10 outputs the write address signal (WA) at the sampling frequency ($f_A$). As a result, the write address counter 10 outputs the write address signal (WA) to store the input data (INPUT) in either the first buffer memory 18 or the second buffer memory 20 at the same time the input data (INPUT) is sampled.

The memory controller 14 clears the write address counter 10 and the read address counter 16 by outputting the clear signal (CLEAR). Specifically, when the sampling frequencies ($f_A$, $f_B$) have a predetermined ratio (M:N), the memory controller 14 outputs the clear signal (CLEAR) to the write address counter 10 at every M number of clock pulses of the frequency ($f_A$) and outputs the clear signal (CLEAR) to the read address counter 16 at every N number of the clock pulses of the frequency ($f_B$). Furthermore, because for a given period of M pulses of the sampling pulse signal ($S_A$) there will be N pulses of the sampling pulse signal ($S_B$) for that period, M number of input data (INPUT) will be stored and N number of the stored input data (INPUT) will be outputted for that period.

The memory controller 14 also outputs the clear signal (CLEAR) to the master counter 12. The master counter 12 outputs a count value based on the number of pulses of the sampling pulse signal ($S_B$) prior to receiving the clear signal (CLEAR). That is, after receiving a clear signal (CLEAR) the count value is cleared. The count value from the master counter 12 is outputted to the memory controller 14 and the interpolation controller 22.

In accordance with the write address signal (WA) and the write control signal (W), the input data (INPUT) is alternately stored in the first and second buffer memories 18 and 20. At the same time, the stored input data (INPUT) is alternately outputted from the first and second buffer memories 18 and 20 in accordance with the read address signal (RA) and the read control signal (R). That is, while the first buffer memory 18 stores input data (INPUT) synchronized with the sampling frequency ($f_A$), the second buffer memory 20 outputs its stored input data (INPUT) in accordance with read address signal (RA) synchronized with the sampling frequency ($f_B$). Specifically, the memory controller 14 outputs a write control signal (W) to the buffer memory 18 to store input data (INPUT) in accordance with the received write address signal (WA). At the same time, the memory controller 14 outputs a read control signal (R) to the second buffer memory 20 to output a stored input data (INPUT) in accordance with the received read address signal (RA). Likewise, storing of the input data (INPUT) into the second buffer memory 20 while reading the stored input data (INPUT) from the first buffer memory 18 is performed in the same manner as above with exception of the (W) control signal being applied to the second buffer memory 20 and a read control signal (R) being applied to the first buffer memory 18.

Alternately outputting of stored input data (INPUT) is performed in the same manner as alternately storing the input data (INPUT) except the read control signal (R) and the read address signal (RA) are applied to a different buffer memory than a buffer memory receiving the write control signal (W) and the write address signal (WA).

As described above, the first and second buffer memories 18 and 20, respectively, alternately perform a write operation in accordance with the sampling frequency ($f_A$) and a read operation in accordance with the sampling frequency ($f_B$).

Accordingly, the interpolation filter :24 receives the stored input data (INPUT) from the first and second buffer memories 18 and 20 and generates output data (OUTPUT) using filter coefficient values stored in the interpolation controller 22. The interpolation filter 24 performs a linear interpolation operation explained by U.S. Pat. No. 4,630,034 to generate the output data (OUTPUT). The linear interpolation operation uses the filter coefficient values, stored in the interpolation controller 22, to convert the input data (INPUT) sampled at the frequency ($f_A$) into output data (OUTPUT) compatible at the frequency ($f_B$).

However, in the above-described prior art frequency converter process, a pair of buffer memories 18 and 20 are employed to handle the sampled data, which increases the amount of memory used and requires a complicated memory control circuit to control the alternating storage of data therein and to control the alternating access thereof. Further, a read only memory ROM is required to store the filter coefficient values, which results in increased hardware costs. Plus, in general, processing speed has improved to a degree in that reading coefficient values from a look-up table, i.e., a ROM memory, is no longer faster than performing a discrete calculation to obtain the coefficient values, in some circumstances.

SUMMARY OF THE INVENTION

Accordingly, the present invention is directed to an improved frequency converter and its operating method that substantially obviates one or more of tile problems due to limitations and disadvantages of the prior art.

An object of the present invention is to provide a frequency counter and its operating method that reduces the amount of memory used.

Another object of the present invention is to provide a frequency converter and its operating method that avoids using a memory for storing filter coefficient values.

Still another object of the present invention is to provide a frequency converter and its operating method that decreases processing time and hardware costs.

A further object of the present invention is to provide a frequency counter and its operating method that converts input data sampled at a first frequency into output data compatible with a system operating at a second frequency.

To achieve these and other objects and in according with the purpose of the present invention, as embodied and broadly described, there is provided frequency converter which includes the steps of: calculating a first coefficient value in accordance with a first frequency; calculating a second coefficient value in accordance with a second frequency; interpolating input data sampled at the first frequency into output data compatible with a system operating at the second frequency using the first and second coefficient values.

In another aspect of the present invention, there is provided a frequency converter, which includes: a first coefficient generator for calculating a first coefficient value; a second coefficient generator for calculating a second coefficient value; an interpolator for interpolating input data sampled at the first frequency into output data compatible with a system operating at the second frequency using the first and second coefficient values.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, wherein:

FIG. 3 is a table of coefficient values used by the frequency converter of FIG. 2; and FIGS. 4A and 4B are waveform diagrams of read/write address signals applied to a dual-port RAM of the frequency converter of FIG. 2, wherein FIG. 4A is a waveform diagram of a write address signal and FIG. 4B is a waveform diagram of a read address signal.

DETAILED DESCRIPTION OF THE INVENTION

Reference will now be made in detail to the preferred embodiment of the present invention, examples of which are illustrated in the accompanying drawings.

Figure 1:
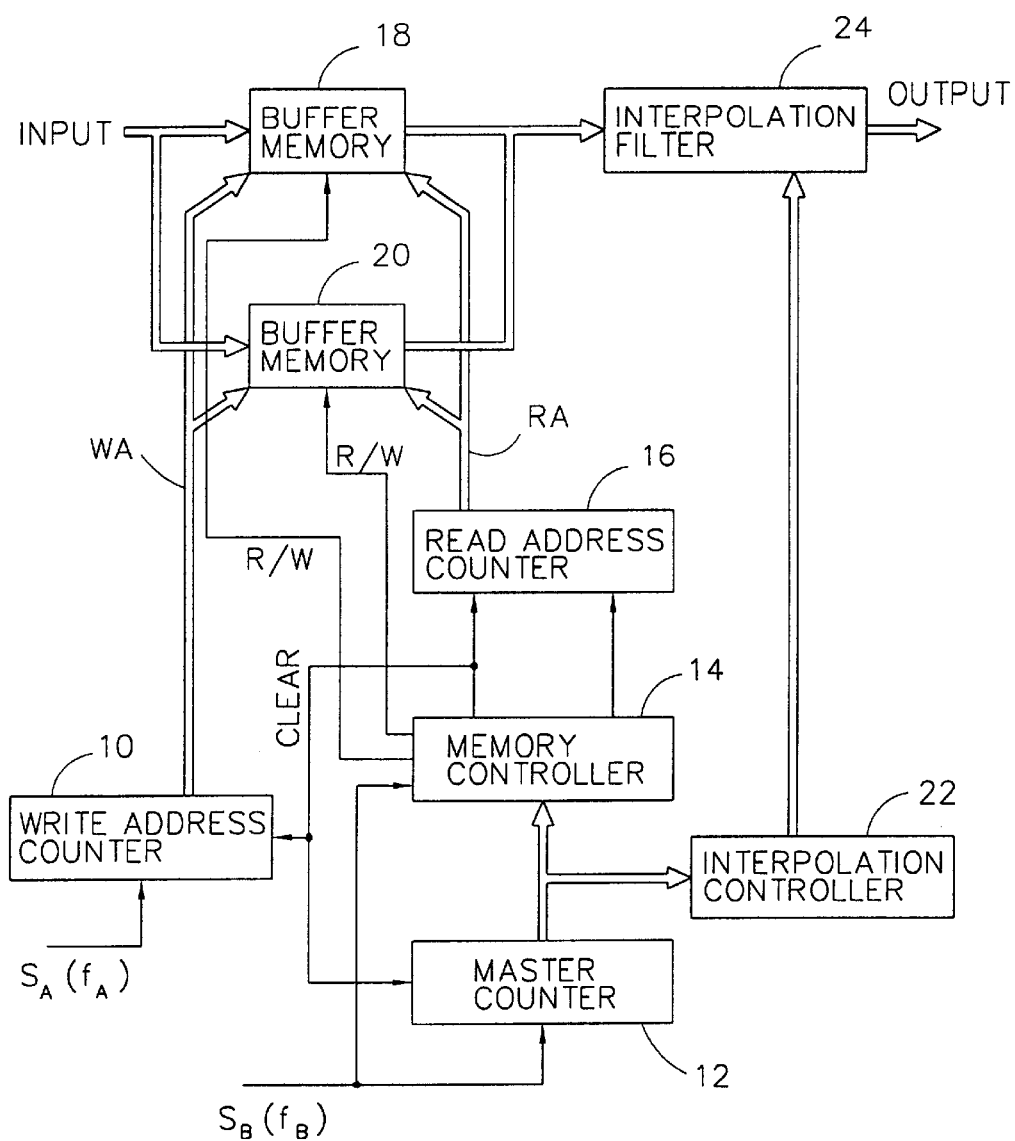
FIG. 1 is a block diagram showing EL prior art frequency converter.
Figure 2:
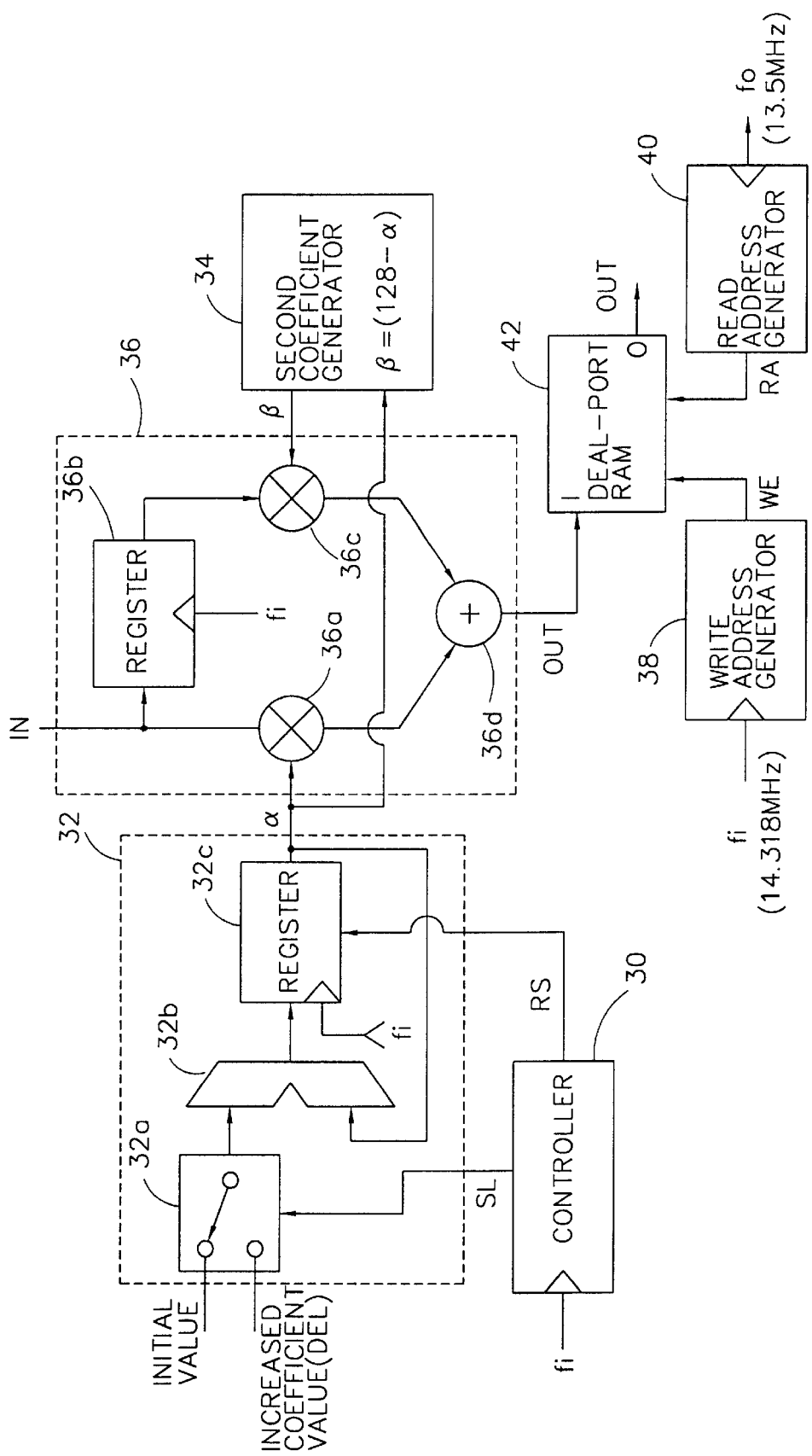
FIG. 2 is a block diagram showing a frequency converter according to the present invention.

As shown in FIG. 2, the frequency converter according to the present invention includes a controller 30, a first coefficient generator 32, a linear interpolation filter 36, a second coefficient generator 34, a dual-port Random Access Memory (RAM) 42, a write address generator 38, and a read address generator 40.

The first coefficient generator includes a multiplexer 32a, an adder 32b, and a register 32c. The second coefficient generator 34 has a similar construction to the first coefficient generator 32 except the second coefficient generator 34 includes, preferably, a subtractor instead of an adder.

The linear interpolation filter 36 includes a register 36b, a first multiplier 36a, a second multiplier 36c, and an adder 36d.

The controller 30 outputs a select signal (SL) and a reset signal (RS) to the multiplexer 32a and the register 32c, respectively, of the first coefficient generator 32. The controller 30 outputs the select signal (SL) and the reset signal (RS) based on a received clock signal having a first sampling frequency (fi). The first sampling frequency (fi) is, preferably, (14.318 MHz). An initial value and an increased coefficient value (DEL) are inputted to the multiplexer 32a of the first coefficient generator 32. The multiplexer 32a selectively outputs the received initial value or the received (DEL) value based on the select signal SL from the controller 30. The adder 32b adds either the initial value or the coefficient increment value (DEL) with the feed back output from the register 32c. The register 32c stores the sum of the adder 32b. Also, the register 32c outputs its contents in accordance with the reset signal (RS) from the controller 30. The output of the register 32c represents first coefficient values ($\alpha$). The controller 30 outputs the select signal (SL) and the reset signal (RS) synchronized with the clock signal (fi) to accumulate the coefficient increment values (DEL) with the initial value.

The second coefficient generator 34 calculates second coefficient values ($\beta$) as the $2^N$ complement of $\alpha$ based on the difference of $2^N$-the first coefficient values ($\alpha$), where preferably N=7, i.e., ($\beta$)=128-$\alpha$. That is, the second coefficient generator 34 calculates the second coefficient values ($\beta$) by using a function that subtracts the first coefficient values ($\alpha$) from a predetermined value (128). The construction of the second coefficient generator 34 uses, preferably, a subtractor (not shown) to perform the function of (128-$\alpha$).

The linear interpolation filter 36 converts the externally received input data (IN) having a sampling frequency of (14.318 MHz), which is equal to the frequency of (fi), into output data (OUT) compatible with a sampling frequency of (13.5 MHz), which is equal to the frequency of (fo). Preferably, the input data (IN) is sampled television image data. Also, the preferred embodiment of the present invention is not limited to sampling frequencies of (13.5 MHz) and (14.318 MHz), respectively, but can use any number of different sampling frequencies.

The linear interpolation filter 36 calculates the output data (OUT) using a linear interpolation operation. The linear interpolation filter 36 performs a linear interpolation on the input data (IN) using the first coefficient values ($\alpha$) calculated from the first coefficient generator 32 and the second coefficient values ($\beta$) calculated from the second coefficient generator 34 to calculate the output data (OUT). The linear interpolation filter 36 multiplies the input data (IN) with the coefficient value ($\alpha$) using the first multiplier 36a. Also, the linear interpolation filter 36 multiples the stored input data (IN) in the register 36b with the second coefficient values ($\beta$) calculated from the second coefficient generator 34 using the second multiplier 36c. The multiplied results are added by the adder 36d. The added result is outputted as the output data (OUT) to a first port (I) of the dual-port RAM 24.

The write address generator 38 outputs a write address signal (WA), by counting a clock signal having the first sampling frequency (fi), to the dual-port RAM 42. The dual-port RAM 42 stores the output data (OUT) received by the first port (I) based on the write address signal (WA). The read address generator 40 outputs a read address signal (RA), by counting a clock signal having the second sampling frequency (fo), to the dual-port RAM 42. The dual-port RAM outputs the stored output data (OUT) from a second port (o) based on the read address signal (RA). The dual-port RAM 42 simultaneously performs a read/write operation by storing (OUT) data from the linear interpolation filter 36 in a memory cell corresponding to the write address signal (WA) and outputting the stored (OUT) data from a memory cell corresponding to the read address signal (RA).

The operation of the frequency converter according to the present invention having the above-described construction will now be described.

First, the controller 30 initializes the register 32c by applying the reset signal (RS). The multiplexer 32a then selects the initial value in accordance with the select signal (SL) outputted form the controller 30. The initial value is then outputted to the adder 32b. Then, the adder 32b adds the initial value outputted from the multiplexer 32a and the value from the register 32c, which has been initialized, to perform an addition operation. The added result is then stored in the register 32c.

After resetting the register 32c, the controller outputs the select signal (SL) to the multiplexer 32a to select the increased coefficient value (DEL) instead of the initial value. Thereafter, the increased coefficient value (DEL) value is applied to one input of the adder 32b and the output of the register 32c is fed back to the other input of the adder 32b. Consequently, the output of the adder 32b will increment the value of the output of the register 32c by the increased coefficient value (DEL). The register 32c stores the sum from the adder 32b in accordance with the clock signal (fi), and outputs the sum as the first coefficient value ($\alpha$).

The multiplexer 32a after reset, selects an increased coefficient value (DEL) having, e.g., the value "8", in accordance with the select signal (SL) outputted from the controller 30. The increased coefficient value (DEL) of "8" is used to increment the value from the register 32c to calculate the next first coefficient value ($\alpha$). That is, the increased coefficient value (DEL) can be represented by the equation (1) as follows:

$$\text{DEL}=\alpha(n)-\alpha(n+1)(n=0,1,\ldots,33) \quad (1)$$

Neighboring first coefficient values ($\alpha$) are obtained by repeatedly adding the increased coefficient value (DEL) to the first coefficient value ($\alpha$) stored in the register 32c. As shown in FIG. 3, the first coefficient values ($\alpha$) are incremented by increments of "8", e.g., $\alpha$ values in rows 2, 3, and etc., which are temporarily stored and outputted from the register 32c. Since the frequency ratio between the first sampling frequency of e.g., (14.318 MHz) and the second sampling frequency of e.g., (13.5 MHz) is 35:33, two coefficient values among 35 coefficient vales are not used. Here, the 0-th and 18-th coefficient values (xx) are dummy coefficients that are arbitrary values, which are not used.

Moreover, the second coefficient generator 34, preferably, subtracts the first coefficient values ($\alpha$) outputted from the first coefficient generator 32 from a predetermined value of "128" to calculate the second coefficient values ($\beta$), as shown in FIG. 3. As stated previously, the second coefficient generator 34 is not limited to the function of 128-the first coefficient values ($\alpha$), but can use, e.g., a $2^N$ complement function to calculate the second coefficient values ($\beta$) from the first coefficient values ($\alpha$). The calculated second coefficient values ($\beta$) are applied to the second multiplier 36c in the linear interpolation filter 36. The linear interpolation filter 36 performs a linear interpolation operation in the same manner as U.S. Pat. No. 4,630,034 which is incorporated by reference in its entirety.

That is, to perform a linear interpolation operation, the first multiplier 36a of the linear interpolation filter 36 multiplies the input data (IN) with the first coefficient values ($\alpha$) outputted from the first coefficient generator 32 and outputs the product value to the adder 36d. Furthermore, the register 36b temporarily stores the input data, synchronized with the clock signal (fi), and outputs the temporarily stored input data to the multiplier 36c. Then, the multiplier 36c multiplies the temporarily stored input data from the register 36b with the second coefficient values (β) calculated from the second coefficient generator 34 and outputs the product to the adder 36d. The adder 36d then adds the products from the multipliers 36a and 36c and outputs the sum to the first port (β) of the dualport RAM (42). Thus, the above operation within the linear interpolation filter 36 performs a linear interpolation. The above linear interpolation operation, preferably, converts input data sampled at a first frequency, e.g., 14.318 MHz, into output data compatible with a second frequency, e.g., 13.5 MHz.

Figure 4A:

The write address generator 38 generates a count value based on the clock signal (fi) and outputs a write address signal (WA), based on the count value, to the first port of the dual-port RAM 42 in accordance with the write address signal (WA) clock periods, as shown in FIG. 4A. The dual-port RAM 42 stores the output data (OUT) from the linear interpolation filter 36 in a memory cell corresponding to the write address signal (WA).

Figure 4B:
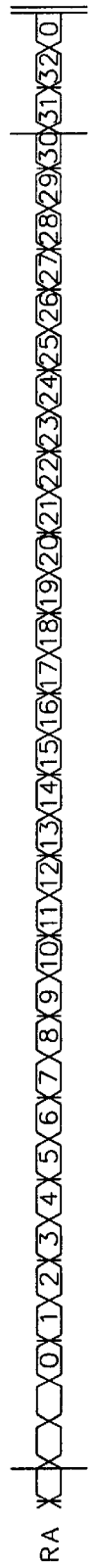

The read address generator 40 generates a count value based on the clock signal (fo) and outputs a read address signal (RA), based on the count value, to the second port of the dual-port RAM 42 in accordance with the read address signal (RA) clock periods, as shown in FIG. 4B. While the dual-port RAM 42 store output data (OUT) from the linear interpolating filter 36, the dual-port RAM 42 outputs the stored output data (OUT) form a memory cell corresponding to the read address signal (RA).

Here, as shown in FIGS. 4A–4B, to eliminate data calculated using the 0-th and 18-th coefficients, i.e., dummy coefficients, the predetermined write address signals corresponding to the (0-th and 18-th) coefficient values are used twice among the write address signals (WA). That is, since the frequency ratio between the clock signal (fi) having the first sampling frequency (14.318 MHz) and the clock signal (fo) having the second sampling frequency (13.5 MHz) provides a 35:33 ratio between (fi) and (fo), two coefficient values are not used among the 35 coefficient values for (fi). Thus, as shown in FIG. 3, only 33 coefficient values are used to calculate the output data (OUT), which is stored in the dual-port RAM 42.

Also, when the increased coefficient value (DEL) inputted to the multiplexer 32a of the first coefficient generator 32 is non-constant, the difference value from the neighboring coefficients is stored in a memory device (not shown) and added to the present coefficient value, and thereby obtaining the (α) coefficient values.

As described in detail above, the frequency converter according to the present invention includes the first coefficient generator 32 for calculating first coefficient values (α) by receiving an initial value and an increased coefficient value (DEL) and the second coefficient generator 34 for calculates the second coefficient values (β) by subtracting the first coefficient values (α) from a predetermined value (128). Therefore, since there is no need to separately store the first and second coefficient values (i.e., α and β), hardware costs are reduced and unnecessary access to memory device are avoided. Further, since the present invention includes dual-port RAM 42 for simultaneously performing read/write operations, unnecessary delay factors are avoided thereby processing time is reduced, and a simpler memory to control is provided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of operating a frequency converter, the method comprising:

calculating first coefficient values in accordance with a first frequency;

calculating second coefficient values;

interpolating input data sampled at the first frequency into output data compatible with a system operating at a second frequency as a function of scaling said input data with said first coefficient values as well as scaling said input data with said second coefficient values;

wherein said calculating of said first coefficient value includes initializing a register with an initialization value in accordance with a reset signal, the output of the register being the first coefficient value, by:

selecting between an initial value and an increased coefficient value in accordance with a select signal;

adding the selected value with the first coefficient value;

temporarily storing the sum in the register in accordance with the first frequency; and outputting the temporarily stored sum as the first coefficient value.

2. The method of claim 1, further comprising the steps of:

storing in a first port of a multi-port memory the output data in accordance with the first frequency; and outputting the stored output data from a second port of the multi-port memory in accordance with the second frequency.

3. The method of claim 2, wherein the step of storing includes the steps of:

generating a write address in accordance with the first frequency; and outputting the write address to the memory to store the output data in the first port of the memory based on the write address.

4. The method of claim 2, wherein the step of outputting includes the steps of:

generating a read address in accordance with the second frequency; and outputting the read address to the memory to output the stored output data from the second port of the memory based on the read address.

5. The method of claim 1, wherein the step of calculating the second coefficient value calculates the second coefficient value as a function of the first coefficient value.

6. A method of operating a frequency converter, the method comprising:

calculating first coefficient values in accordance with a first frequency;

calculating second coefficient values as 2N complements of the first coefficient values, where N is an integer and N≧2; and interpolating input data sampled at the first frequency into output data compatible with a system operating at a second frequency using the first and second coefficient values.

7. The method of claim 6, wherein the step of calculating the second coefficient value includes the steps of:

receiving the first coefficient value;

subtracting the received first coefficient value from a predetermined value; and outputting the difference as the second coefficient value.

8. The method of claim 7, wherein the predetermined value is 128.

9. The method of claim 1, wherein the step of interpolating linearly interpolates the input data into the output data.

10. The method of claim 9, wherein the step of linearly interpolating the input data includes the steps of:

multiplying the input data with the first coefficient value;

temporarily storing the input data in a register in accordance with the first frequency;

multiplying the temporarily stored input value with the second coefficient value;

adding the multiplied products; and outputting the sum as the output data.

11. The method of claim 1, wherein the memory is a dual-port random access memory RAM.

12. The method of claim 1, wherein the first frequency is 14.318 MHz and the second frequency is 13.5 MHz.

13. A frequency converter, comprising:

a first coefficient generator for calculating first coefficient values;

a second coefficient generator for calculating second coefficient values;

an interpolator for interpolating input data sampled at the first frequency into output data compatible with a system operating at a second frequency as a function of scaling said input data with said first coefficient values as well as scaling said input data with said second coefficient values; and a controller for generating a select signal and a reset signal;

wherein the first frequency generator includes:

a multiplexer for selecting one of an initial value and a coefficient increment value in accordance with the select signal;

an adder for adding the selected value from the multiplexer with the first coefficient value; and a register, which is initialized in accordance with the reset signal, for temporarily storing the sum in accordance with the first frequency.

14. The frequency converter of claim 13, further comprising:

a multi-port memory having a first port for storing the output data in accordance with the first frequency and a second port for outputting the stored output data in accordance with the second frequency.

15. The frequency converter of claim 14, wherein the multi-port memory is a dual-port random access memory RAM.

16. The frequency converter of claim 14, further including:

a write address generator for generating a write address in accordance with the first frequency and for outputting the write address to the memory to store the output data in the first port of the memory based on the write address; and a read address generator for generating a read address in accordance with the second frequency and for outputting the read address to the memory to output the stored output data from the second port of the memory based on the read address.

17. The frequency converter of claim 16, wherein the first coefficient value comprises of:

a dummy coefficient value having a corresponding write address, the dummy coefficient value being repeatedly generated.

18. The frequency converter of claim 13, wherein the interpolator is a linear interpolator.

19. The frequency converter of claim 18, wherein the linear interpolator includes:

a first multiplier for multiplying input data with the first coefficient value;

a register for temporarily storing the input data;

a second multiplier for multiplying the temporarily stored input data with the second coefficient value; and an adder for adding the products of the first multiplier and the second multiplier and for outputting the added result as the output data.

20. The frequency converter of claim 13, wherein the first frequency is 14.318 MHz and the second frequency is 13.5 MHz.

21. The frequency converter of claim 13, wherein the second coefficient generator calculates the second coefficient value as a function of the first coefficient value.

22. A frequency converter comprising:

a first coefficient generator for calculating first coefficient values;

a second coefficient generator for calculating second coefficient values as 2N complements of the first coefficient values, where N is an integer and $N \geq 2$; and an interpolator for interpolating input data sampled at the first frequency into output data compatible with a system operating at a second frequency using the first and second coefficient values.

23. The frequency converter of claim 22, wherein the second coefficient generator includes:

a subtractor to calculate the second coefficient value, the subtractor subtracting the first coefficient value from a predetermined value.

24. The frequency converter of claim 23, wherein the predetermined value is 128.

* * * * *